Patented Mar. 1, 1932

1,847,583

UNITED STATES PATENT OFFICE

WILLIAM H. WILLIAMS, OF MIDLAND, MICHIGAN, ASSIGNOR TO THE DOW CHEMICAL COMPANY, OF MIDLAND, MICHIGAN, A CORPORATION OF MICHIGAN

FLAKE ORTHO-PHENYL PHENOL

No Drawing.    Application filed July 29, 1930.   Serial No. 471,603.

One of the secondary products obtained from the alkaline hydrolysis of chlorobenzene, wherein of course phenol is the principal product, is ortho-phenyl phenol. The aforesaid compound is commonly purified and separated from the accompanying isomeric para-phenyl phenol by a process of fractional distillation, and the liquid condensate from such distillation is filled into metal drums, which are the usual form of shipping container, and allowed to solidify therein. The solid cake, however, possesses an unusual degree of hardness for a material of this general type, and is extremely difficult to break up and reduce to granular particles of suitable fineness for preparing the various chemical and pharmaceutical compositions in which the compound is used commercially. The usual methods of crushing and grinding have not been found satisfactory, or even feasible, for quantity production purposes, owing at least in part to the tendency of the compound to splinter, forming particles with sharp, jagged projections on the surface which cause them to coalesce and agglomerate together in storage. Grinding has also been found to produce an excessive amount of fine dust along with the desired granular product. Other methods of comminuting or sub-dividing frequently employed with solid organic materials, such as by crystallizing or granulating, are likewise open to objection, in the first instance on account of the high degree of solubility of the present compound in all of the usual organic solvents, and in the second due to the hardness of the compound which enables it to resist forcing through the meshes of a sizing screen in the manner employed with certain other solid organic substances.

I have now found that the foregoing difficulties may all be avoided and a satisfactory sub-divided form of product prepared in a simple, direct and economical way by flaking the fused compound. The invention, then, consists in a new product, viz. a flake form of ortho-phenyl phenol, together with the steps for the preparation thereof, as hereinafter fully described and particularly pointed out in the claim.

The flaking operation may be carried out with the usual form of flaking apparatus, consisting of an internally water-cooled revolving drum dipping into a pan or trough containing the molten material to be flaked. Some of the molten material adheres as a thin film upon the surface of the drum as it dips thereinto, the film being chilled and solidified on the cooled surface as the drum continues through its revolution, and the solid film is then scraped off in the form of flakes by means of a knife or scraper provided therefor. The molten material, ortho-phenyl phenol, is held in the pan at a temperature preferably just slightly above its melting point, e. g. between 55° and 60° C. The melting point of the pure compound is believed to be 56° C., but that of the commercial product may vary from about 53° to 58° C. The cooling water, which is most conveniently obtained from an available natural source and will vary somewhat in temperature with the season and climate, should be at a temperature such as to maintain the drum surface at an average temperature between about 25° and 45° C. Naturally at the lower temperatures the capacity of the flaking apparatus will be somewhat greater than at the higher temperatures.

Example

A flaker drum was employed having a 12 inch face x 18 inch diameter, and rotated at a speed of approximately 11 R. P. M. The temperature of the cooling water was approximately 32° C., a rate of flow thereof being maintained sufficient to hold the temperature of the detached flakes not materially above 45° C., using molten ortho-phenyl phenol at a temperature between 55° and 60° C. The output of flake product was approximately 27 pounds per minute.

The foregoing example is given for purpose of illustration only, and is not to be construed as limiting the invention. Modified operating conditions may be used without materially affecting the invention, as will be readily apparent to those familiar with the flaking of other materials. Likewise, other forms of mechanical apparatus may be used, as, for instance, one in which an endless metallic belt is employed instead of a cylindrical drum. The material of which the chilling surface is made may be any suitable metal, preferably iron or steel, although we have found that a nickel surface gives excellent results in permitting a clean and easy detachment of the flakes.

The ortho-phenyl phenol flake product so prepared consists of small, brittle, plate-like particles of fairly uniform size, which are easily classified by simple means and may be handled without any great amount of pulverizing or dusting. The particles do not coalesce or cake in the package under any usual storage conditions. The product is easy to utilize and dispense and is greatly superior for preparing solutions or for incorporating with other materials than the forms thereof heretofore known and used.

Other modes of carrying out the invention may be employed, change being made as regards the method herein disclosed, provided the steps or material stated by the following claim or the equivalent of such stated steps or material be employed.

I therefore particularly point out and distinctly claim as my invention:—

As a new article of manufacture, ortho-phenyl phenol in the form of flake particles.

Signed by me this 24th day of July, 1930.

WILLIAM H. WILLIAMS.